United States Patent
Zhou et al.

(10) Patent No.: US 11,150,655 B2
(45) Date of Patent: Oct. 19, 2021

(54) METHOD AND SYSTEM FOR TRAINING UNMANNED AERIAL VEHICLE CONTROL MODEL BASED ON ARTIFICIAL INTELLIGENCE

(71) Applicant: BEIJING BAIDU NETCOM SCIENCE AND TECHNOLOGY CO., LTD., Beijing (CN)

(72) Inventors: Bo Zhou, Beijing (CN); Fan Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 309 days.

(21) Appl. No.: 16/020,340

(22) Filed: Jun. 27, 2018

(65) Prior Publication Data

US 2019/0004518 A1 Jan. 3, 2019

(30) Foreign Application Priority Data

Jun. 30, 2017 (CN) .......................... 201710521592.5

(51) Int. Cl.
*G05D 1/00* (2006.01)
*G06N 3/08* (2006.01)
(Continued)

(52) U.S. Cl.
CPC ......... *G05D 1/0088* (2013.01); *B64C 39/024* (2013.01); *G05D 1/101* (2013.01);
(Continued)

(58) Field of Classification Search
CPC .... G05D 1/0088; G05D 1/101; B64C 39/024; B64C 2201/141; B64C 2201/143;
(Continued)

(56) References Cited

U.S. PATENT DOCUMENTS 5,925,089 A * 7/1999 Fujime ................ F02D 41/1401
701/106
6,505,182 B1 * 1/2003 Van den Heuvel ..........................
G06K 9/00523
706/41

(Continued)

FOREIGN PATENT DOCUMENTS

CN 104880945 * 9/2015
CN 104880945 A 9/2015
(Continued)

OTHER PUBLICATIONS

Chinese Office Action dated Feb. 3, 2020, for related Chinese Appln. No. 201710521592.5; 7 Pages.
(Continued)

*Primary Examiner* — Richard A Goldman
(74) *Attorney, Agent, or Firm* — Brooks Kushman P.C.

(57) ABSTRACT

The present disclosure provides a method and system for training an unmanned aerial vehicle control model based on artificial intelligence. The method comprises: obtaining training data by using sensor data and target state information of the unmanned aerial vehicle and state information of the unmanned aerial vehicle under action of control information output by a deep neural network; training the deep neural network with the training data to obtain an unmanned aerial vehicle control model, the unmanned aerial vehicle control model being used to obtain the control information of the unmanned aerial vehicle according to the senor data and target state information of the unmanned aerial vehicle.

12 Claims, 2 Drawing Sheets

(51) Int. Cl.
*B64C 39/02* (2006.01)
*G05D 1/10* (2006.01)
*G06N 3/00* (2006.01)
*G06N 7/00* (2006.01)
*G06N 3/04* (2006.01)

(52) U.S. Cl.
CPC ............... *G06N 3/006* (2013.01); *G06N 3/04* (2013.01); *G06N 3/08* (2013.01); *G06N 7/005* (2013.01); *B64C 2201/141* (2013.01)

(58) Field of Classification Search
CPC ........ B64C 2201/145; B64C 2201/146; G06N 3/006; G06N 3/04; G06N 3/08; G06N 3/02; G06N 20/00; G06N 7/005; B60W 30/08; B60W 30/09; G05B 13/0265; G05B 13/027
USPC .......................................... 701/3, 23, 24, 106
See application file for complete search history.

(56) References Cited

U.S. PATENT DOCUMENTS

| | | | | |
|---|---|---|---|---|
| 8,031,060 | B2* | 10/2011 | Hoffberg | G05B 19/042 340/426.16 |
| 8,364,136 | B2* | 1/2013 | Hoffberg | H04N 21/44222 455/418 |
| 2004/0068416 | A1* | 4/2004 | Solomon | G05D 1/0088 446/454 |
| 2012/0114229 | A1* | 5/2012 | Zhou | G06T 3/4038 382/164 |
| 2012/0150651 | A1* | 6/2012 | Hoffberg | G06F 3/0482 705/14.58 |
| 2014/0019392 | A1* | 1/2014 | Buibas | G06N 3/04 706/23 |
| 2018/0231985 | A1* | 8/2018 | Sun | B64D 47/08 |
| 2019/0004518 | A1* | 1/2019 | Zhou | G06N 3/04 |
| 2019/0101919 | A1* | 4/2019 | Kobilarov | G05D 1/0274 |
| 2019/0155284 | A1* | 5/2019 | Zavesky | B60W 30/0953 |
| 2019/0303668 | A1* | 10/2019 | King | H04W 4/029 |
| 2019/0377354 | A1* | 12/2019 | Shalev-Shwartz | B60W 30/0956 |
| 2020/0104966 | A1* | 4/2020 | Cella | G05B 13/027 |
| 2020/0118544 | A1* | 4/2020 | Lee | G10L 15/005 |

FOREIGN PATENT DOCUMENTS

| | | |
|---|---|---|
| CN | 104934968 A | 9/2015 |
| CN | 104978580 A | 10/2015 |
| CN | 105488528 A | 4/2016 |
| CN | 106094516 A | 11/2016 |
| CN | 106127146 A | 11/2016 |

OTHER PUBLICATIONS

Chinese Search Report dated Jan. 17, 2020 for related Chinese Appln. No. 2017105215925; 3 Pages.

* cited by examiner

METHOD AND SYSTEM FOR TRAINING UNMANNED AERIAL VEHICLE CONTROL MODEL BASED ON ARTIFICIAL INTELLIGENCE

The present application claims the priority of Chinese Patent Application No. 2017105215925, filed on Jun. 30, 2017, with the title of "Method and system for training unmanned aerial vehicle control model based on artificial intelligence". The disclosure of the above applications is incorporated herein by reference in its entirety.

FIELD OF THE DISCLOSURE

The present disclosure relates to the field of artificial intelligence, and particularly to a method and system for training an unmanned aerial vehicle control model based on artificial intelligence.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

An unmanned aerial vehicle refers to an unmanned aircraft which is manipulated via wireless remote control or program control and has characteristics such as flexibility, low costs, portability and reusability. The unmanned aerial vehicle is enabled to complete dangerous tasks unfulfillable for an aircraft by mounting an auto flight control system on the unmanned aerial vehicle and integrating various vehicle-mounted sensors, image acquiring devices and wireless communication devices and the like. Therefore, unmanned aerial vehicles have wide application and development prospects in military and civil aspects. The increasingly mature unmanned aerial vehicle technologies to a certain degree reflect a development degree of aviation technologies and artificial intelligence technologies of a country.

In the prior art, the flight of the unmanned aerial vehicle is controlled mainly via a PID control algorithm. State information of the unmanned aerial vehicle is acquired via vehicle-mounted sensors such as a gyro (for sensing flight postures), an accelerator, a geomagnetic inductor, an air pressure sensor (for hovering control) and a GPS module (for positioning purpose), target state information is received from a remote controller, control information is output through the PID control algorithm, and the unmanned aerial vehicle is controlled to execute the control information.

The above PID control algorithm is comparing the target state information with the state information after the control information is executed, to obtain an error signal, and linearly combining a proportion P, an integral I and a differential D of the error signal to form a control quantity. In many cases, the three units usually are not curtained required, but the proportion unit is requisite.

1. The proportional stage (P): directly enlarge or reduce the error signal, so increasing parameters of the proportional stage may improve a response speed and reduce a steady-state error. However, quickness and stability are always contradictory. While the coefficient of proportionality is increased, the stability of the system will fall gradually, and the system might be subjected to overshoot, oscillation and even divergence.
2. The integral stage (I): as known the definition of the integral, this stage constantly accumulates errors and may achieve elimination of steady-state errors. The larger the gain is, the stronger the integral's function is, and the faster the steady-state errors are eliminated. However, the problems caused by the stage are likely occurrence of integral saturation phenomenon, large overshoot and delay of the speed at which the system enters the steady state.
3. The differential stage (D): this is a stage in advance. Whether the control quantity should be reduced or increased is known ahead to avoid causing overshoot and oscillation. Hence, increasing the gain of this gain helps improve the system stability and avoids oscillation, but produces a side effect to the quickness; furthermore, the differential stage produces an enlarging action upon the noise signal.

It can be seen that the PID control algorithm is difficult in adjusting and setting the parameters, exhibits a lower precision as compared with advanced control algorithms, and shows strong inertia and undesirable object effects for some non-linear complicated environment. As scenarios to which unmanned aerial vehicles may be applied become more and more, and the flight environment becomes more and more complicated, higher and higher requirements are raised for the flight control systems of the unmanned aerial vehicles.

SUMMARY OF THE DISCLOSURE

A plurality of aspects of the present disclosure provide a method and system for training an unmanned aerial vehicle control model based on artificial intelligence, to improve the precision of the flight control system of the unmanned aerial vehicle, and achieve a controlling effect of strong inertia in a nonlinear complicated environment.

According to an aspect of the present disclosure, there is provided a method for training an unmanned aerial vehicle control model based on artificial intelligence, wherein the method comprises:

obtaining training data by using sensor data and target state information of the unmanned aerial vehicle and state information of the unmanned aerial vehicle under action of control information output by a deep neural network;

training the deep neural network with the training data to obtain an unmanned aerial vehicle control model, the unmanned aerial vehicle control model being used to obtain the control information of the unmanned aerial vehicle according to the senor data and target state information of the unmanned aerial vehicle.

The above aspect and any possible implementation mode further provide an implementation mode: the obtaining training data by using sensor data and target state information of the unmanned aerial vehicle and state information of the unmanned aerial vehicle under action of control information output by a deep neural network comprises:

in a pre-built simulated environment, regarding the sensor data and target state information of the unmanned aerial vehicle as input of the deep neural network, the deep neural network outputting corresponding control information;

according to a difference between the state information of the unmanned aerial vehicle under action of the control information output by the deep neural network and the target state information, judging whether the control information complies with an expectation for reaching target state information, and providing a positive/negative feedback;

regarding the sensor data, the target state information and the control information as training samples.

The above aspect and any possible implementation mode further provide an implementation mode: the training the deep neural network comprises:

training the deep neural network on the principle of minimized loss, to minimize the difference between the state information of the unmanned aerial vehicle under action of the control information output by the deep neural network and the target state information.

The above aspect and any possible implementation mode further provide an implementation mode: the target state information comprises continuous random target state information.

The above aspect and any possible implementation mode further provide an implementation mode: the deep neural network comprises a deep reinforcement learning neural network based on a Deep Deterministic Policy Gradient.

The above aspect and any possible implementation mode further provide an implementation mode: the unmanned aerial vehicle control module comprises a deep neural network and a Q value estimation network;

the policy network is responsible for outputting corresponding control information according to the sensor data and the target state information;

the Q value estimation network is responsible for evaluating the control information according to the sensor data, the target state information and the control information output by the policy network.

The above aspect and any possible implementation mode further provide an implementation mode: the training the deep neural network with the training data to obtain an unmanned aerial vehicle control model comprises:

training the deep neural network model with training samples obtained from a simulated environment until a condition of minimizing a difference between the state information of the unmanned aerial vehicle under action of the control information output by the deep neural network and the target state information is reached; using training samples obtained from an actual environment to train the deep neural network model which is already trained in the simulated environment.

According to another aspect of the present disclosure, there is provided a method of controlling an unmanned aerial vehicle, wherein the method comprises:

obtaining sensor data of the controlled unmanned aerial vehicle;

inputting the sensor data and the target state information into the unmanned aerial vehicle control model, to obtain control information output by the unmanned aerial vehicle control model;

outputting the control information to the controlled unmanned aerial vehicle;

wherein the unmanned aerial vehicle control model is pre-built by using the above-mentioned method.

According to another aspect of the present disclosure, there is provided a system for training an unmanned aerial vehicle control model based on artificial intelligence, wherein the system comprises a training data obtaining unit and a neural network training unit; wherein the training data obtaining unit is configured to obtain training data by using sensor data and target state information of the unmanned aerial vehicle and state information of the unmanned aerial vehicle under action of control information output by a deep neural network;

the neural network training unit is configured to train the deep neural network with the training data to obtain an unmanned aerial vehicle control model, the unmanned aerial vehicle control model being used to obtain the control information of the unmanned aerial vehicle according to the senor data and target state information of the unmanned aerial vehicle.

The above aspect and any possible implementation mode further provide an implementation mode: the training data obtaining unit is further configured to, in a pre-built simulated environment, regard the sensor data and target state information of the unmanned aerial vehicle as input of the deep neural network, the deep neural network outputting corresponding control information;

according to a difference between the state information of the unmanned aerial vehicle under action of the control information output by the deep neural network and the target state information, judge whether the control information complies with an expectation for reaching target state information, and provide a positive/negative feedback;

regard the sensor data, the target state information and the control information as training samples.

The above aspect and any possible implementation mode further provide an implementation mode: the neural network training unit is further configured to train the deep neural network on the principle of minimized loss, to minimize the difference between the state information of the unmanned aerial vehicle under action of the control information output by the deep neural network and the target state information.

The above aspect and any possible implementation mode further provide an implementation mode: the target state information comprises continuous random target state information.

The above aspect and any possible implementation mode further provide an implementation mode: the deep neural network comprises a deep reinforcement learning neural network based on a Deep Deterministic Policy Gradient.

The above aspect and any possible implementation mode further provide an implementation mode: the unmanned aerial vehicle control module comprises a deep neural network and a Q value estimation network;

the policy network is responsible for outputting corresponding control information according to the sensor data and the target state information;

the Q value estimation network is responsible for evaluating the control information according to the sensor data, the target state information and the control information output by the policy network.

The above aspect and any possible implementation mode further provide an implementation mode: the neural network training unit is further configured to train the deep neural network model with training samples obtained from a simulated environment until a condition of minimizing a difference between the state information of the unmanned aerial vehicle under action of the control information output by the deep neural network and the target state information is reached; use training samples obtained from an actual environment to train the deep neural network model which is already trained in the simulated environment.

According to another aspect of the present disclosure, there is provided a system of controlling an unmanned aerial vehicle, wherein the system comprises:

a navigation/inertia measurement unit configured to obtain sensor data of the controlled unmanned aerial vehicle;

a control information obtaining unit configured to input the sensor data and the target state information into the unmanned aerial vehicle control model, to obtain control information output by the unmanned aerial vehicle control model;

a control information output unit configured to output the control information to the controlled unmanned aerial vehicle;

wherein the unmanned aerial vehicle control model is pre-built by using the above-mentioned system.

According to a further aspect of the present disclosure, there is provided a device, wherein the device comprises:

one or more processors;

a memory for storing one or more programs, the one or more programs, when executed by said one or more processors, enabling said one or more processors to implement any above-mentioned method.

According to another aspect of the present disclosure, there is provided a computer readable medium on which a computer program is stored, wherein the program, when executed by a processor, implements any above-mentioned method.

The technical solutions provided by the embodiments can be employed to avoid problems in the prior art that the PID control algorithm is difficult in adjusting and setting the parameters, exhibits a lower precision as compared with advanced control algorithms, and shows strong inertia and undesirable object effects for some non-linear complicated environment; parameter learning is automated, and robustness is strong; the technical solution can respond to nonlinear complicated environments; the technical solution can still be used in the case of strong inertia; furthermore, the technical solution can substantially reduce the number of training samples, reduce time spent in collecting samples, and decrease costs.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

A four-shaft unmanned aerial vehicle comprises a machine body and an aircraft control module secured to the machine body, and further comprises motor drive modules fixed on four cantilevers of the machine body and rotors driven by the motors. In addition, the four-shaft unmanned aerial vehicle further comprises a navigation/inertia measurement unit and a power supply module mounted on the machine body and respectively connected with the aircraft control module, and further comprises a communication module communicatively connected with the aircraft control module and a power supply module for powering the aircraft control module; the navigation/inertia measurement unit tracks and positions the four-shaft unmanned aerial vehicle, provides the aircraft control module with positional information and navigation, and comprises a three-shaft accelerator, a gyro, a magnetometer, a barometer and a GPS which are respectively connected with the aircraft control module. The three-shaft accelerator is used to measure decomposed accelerations of gravitational acceleration on coordinate axes of the machine body of the unmanned aerial vehicle; the gyro is used to measure a 3-dimensional angular speed of the unmanned aerial vehicle; the magnetometer is used to measure the intensity of magnetic field components of the magnetic field on the coordinate axes of the machine body of the unmanned aerial vehicle; the barometer is used to measure a height of the machine body of the unmanned aerial vehicle, and Z coordinate of the coordinate axis; the GPS is used to measure the position of the machine body of the unmanned aerial vehicle, and X and Y coordinates of the coordinate axes. The height information is generally replaced with the barometer.

The navigation/inertia measurement unit obtains sensor data composed of current location information and three-shaft acceleration, roll angular velocity, pitch angular velocity, yaw angular velocity and so on. The control module of the four-shaft unmanned aerial vehicle obtains the unmanned aerial vehicle control module by a method for training an unmanned aerial vehicle control model based on artificial intelligence, comprehensively calculates the sensor data and the target state information and then outputs the control information to an electronic speed control, and then the electronic speed control controls the rotation speeds of the four motors according to the obtained control information, thereby implementing the control of lifting forces and torques generated by the four rotors. The motor may control its rotation speed through PWM and thereby achieve the control of the force generated by each rotor and the magnitude of the torque.

Figure 1:
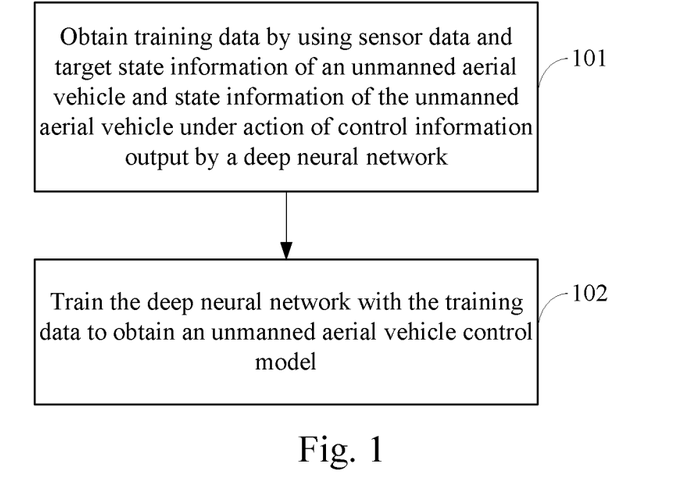
FIG. 1 is a flow chart of an unmanned aerial vehicle flight control method based on artificial intelligence according to an embodiment of the present disclosure.

FIG. 1 is a flow chart of a method for training an unmanned aerial vehicle control model based on artificial intelligence according to an embodiment of the present disclosure. As shown in FIG. 1, the method comprises the following steps:

101: obtaining training data by using sensor data and target state information of the unmanned aerial vehicle and state information of the unmanned aerial vehicle under action of control information output by a deep neural network;

specifically, in a pre-built simulated environment, regarding the sensor data and target state information of the unmanned aerial vehicle as input of the deep neural network, the deep neural network outputting corresponding control information;

according to a difference between the state information of the unmanned aerial vehicle under action of the control information output by the deep neural network and the target state information, judging whether the control information complies with an expectation for reaching target state information, and providing a positive/negative feedback;

regarding the sensor data, the target state information and the control information as training samples.

Preferably, the sensor data comprises one or more kinds of data of sensors such as a three-shaft accelerator, a gyro, a magnetometer, a barometer and a GPS.

Preferably, different target state information is sent to the unmanned aerial vehicle so that the neural network can learn various target state information.

The simulated environment is specifically built by using a simulation platform such as Microsoft's Aerial Informatics and Robotics Platform (briefly called AirSim), or a Gazebo simulation platform of ROS robot operating system; an unmanned aerial vehicle simulation model is mounted in the simulated environment. The unmanned aerial vehicle simulation model may be described by using Unified Robot Description Format (URDF) language.

In essence, the simulated environment may be considered as a data generator so that massive data are generated and recorded according to sensing modes of sensors on the unmanned aerial vehicle such as a three-shaft accelerator, a gyro, a magnetometer, a barometer and a GPS, and these data are used to perform repeated test in the simulated environment. Therefore, it is feasible to increase test quantity and test speed to obtain massive data at a very small price, thereby performing training of artificial intelligence and improving the training efficiency of the artificial intelligence. In addition, the simulated test is of lower costs and can avoid impingement loss encountered upon testing in an actual environment.

102: training the deep neural network with the training data to obtain an unmanned aerial vehicle control model, the unmanned aerial vehicle control model being used to obtain the control information of the unmanned aerial vehicle according to the senor data and target state information of the unmanned aerial vehicle.

Specifically, it is feasible to train the deep neural network on the principle of minimized loss, to minimize the difference between the state information of the unmanned aerial vehicle under action of the control information output by the deep neural network and the target state information.

In a preferred embodiment, in step 101, the target state information is continuous random target state information; namely, step 101 comprises:

obtaining the training data by using sensor data and continuous random target state information of the unmanned aerial vehicle and state information of the unmanned aerial vehicle under action of control information output by the deep neural network;

specifically, in a pre-built simulated environment, regarding the sensor data and continuous random target state information of the unmanned aerial vehicle as input of the deep neural network, the deep neural network outputting corresponding control information;

according to a difference between the state information of the unmanned aerial vehicle under action of the control information output by the deep neural network and the target state information, judging whether the control information complies with an expectation for reaching target state information, and providing a positive/negative feedback;

regarding the sensor data, the target state information and the control information as a group of training samples.

The neural network is a deep reinforcement learning neural network based on DDPG (Deep Deterministic Policy Gradient), and specifically comprises a policy network and a Q value estimation network, wherein, the policy network $\mu(s|\theta^\mu)$ is responsible for outputting corresponding control information according to the sensor data and the continuous random target state information of the unmanned aerial vehicle, and its neural network parameter is $\theta^\mu$;

the Q value estimation network $Q(s, a|\theta^Q)$ is responsible for evaluating the control information according to the sensor data and continuous random target state information of the unmanned aerial vehicle and the control information output by the policy network, and estimating whether the control information can gain a long-term profit, and its neural network parameter is $\theta^Q$;

the policy network and the Q value estimation network are updated according to output of the Q value estimation network.

Preferably, it is feasible to create and use a target network including duplicates of the policy network and the Q value estimation network to calculate a target value.

Preferably, the policy network comprises: an input layer; a fully-connected layer cyclically repeating at least once, a non-linear activation layer; and an output layer. According to an embodiment, it is possible to select: input layer→fully-connected layer→nonlinear activation layer→fully-connected layer→nonlinear activation layer→output layer. Certainly, other network structures can also be designed. The present disclosure does not limit this.

Preferably, the Q value estimation network comprises: an input layer; a fully-connected layer cyclically repeating at least twice, nonlinear activation layer; a joining layer; and an output layer. According to an embodiment, it is possible to select: input layer→fully-connected layer→nonlinear activation layer→joining layer→fully-connected layer→nonlinear activation layer→fully-connected layer→output layer. Certainly, other network structures can also be designed. The present disclosure does not limit this. The control information and the target state information are not used unless they are input to the second full-connected layer of the network; the sensor signals undergo the processing of the fully-connected layer and the nonlinear activation layer, and then are, together with the control information and the target state information, input into the joining layer for subsequent processing.

Preferably, the step 102 comprises:

Step 201: selecting and inputting training samples into the neural network;

Specifically, it is feasible to select, from a set of samples, a group of training samples formed by the sensor data, the target state information and the control information whose correspondence relationship has already been built, and input the group of training samples into the neural network, namely, one end of the input is the sensor data and the target state information, and the other end of the input is the control information;

Step 202: using a minimum loss function to update the Q value estimation network.

It is feasible to calculate a set of the sensor data and the target state information and the control information before a time t, $$s_t = (x_1, a_1, \ldots, a_{t-1}, x_t) = x_t \quad (1)$$

In equation (1), $x_t$ is the sensor data and the target state information at the time t; $a_t$ is the control information at the time t;

use a Q value function to describe a long-term profit $$\text{long-term profit is } Q^\pi(s^t, a^t) = E[R^t | S^t, a^t] \quad (2)$$

where $R_t = \sum_{i=t}^{T} \gamma^{i-t} r(s_i, a_i)$ is a long-term profit sum gained at the time t and resulting from discount, $\gamma \in [0,1]$ is a discount coefficient, $r(s_t, a_t)$ is a profit function at the time t, T is the time when the act ends, and $\pi$ is a policy probability;

since the policy probability $\pi$ is predetermined, it is recorded as a target policy $\mu:S \leftarrow A$, where S is a state space, and A is an act space, and meanwhile Bellman Equation (2) is used to obtain:

$$Q^\mu(s_t, a_t) = E_{s_{t+1} \sim E}[r(s_t, a_t) + \gamma Q^\mu(S_{t+1}, \mu(S_{t+1}))] \quad (3)$$

In equation (3), $s_{t+1} \sim E$ represents that the sensor data and target state information at time t+1 are obtained from an environment E, and $\mu(S_{t+1})$ represents the act to which the sensor data and target state information at time t+1 are mapped through the target policy $\mu$;

Use the principle of maximum likelihood estimation to update the Q value estimation network $Q(s, a | \theta^Q)$ whose network weight parameter is $\theta^Q$ through the minimum loss function, the used loss function being:

$$L(\theta^Q) = E_\mu \cdot [(Q(S_t, a_t | \theta^Q) - y_t)^2] \quad (4)$$

In equation (4), $y_t = r(s_t, a_t) + \gamma Q(S_{t+1}, \mu(S_{t+1})) | \theta^Q$;

In this way, $Q(s, a | \theta^Q)$ gets increasingly closer to an actual value, namely, the modeling for scenarios gets increasingly precise.

Step 203: using a policy gradient to update the policy network.

As for the policy network whose actual parameter is $\theta^\mu$, a chain rule is employed to obtain the policy gradient $$\nabla_{\theta^\mu} \mu = E_\mu \cdot [\nabla_a Q(S, a | \theta^Q)|_{s=s_t, a=\mu(S_t)} \nabla_{\theta^\mu(S_t)} \nabla_{\theta^\mu} \mu(s | \theta^\mu) | S = S_t]$$

(5), and then the policy gradient is used to update the policy function $\mu(s | \theta^\mu)$ of the policy network.

Step 204: using a slow update policy to update the target network.

Under many environments (including TORCS), it proves unstable that the neural network is directly used to implement the Q value function. Hence, in the present embodiment, the duplicates of the policy network and the Q value estimation network are used to calculate the target value. The weights of the target network use the slow update policy, i.e., let themselves slowly track the learnt network for updating. The used slow update policy is:

$$\theta^Q \leftarrow \tau \theta^Q + (1-\tau) \theta^{Q'} \quad (6)$$

$$\theta^\mu \leftarrow \tau \theta^\mu + (1-\tau) \theta^{Q'} \quad (7)$$

In formula (6) and (7), $\tau$ is an update rate, and $\tau \ll 1$. This means that the target value is limited as slowing changing, which substantially improves stability of learning.

Through the above steps, a DDPG-based deep reinforcement learning network is obtained by training, and is a converging neural network.

One or more groups of training samples are randomly selected from the set of samples to train the neural network. The samples may be made relatively stable by randomly selecting the training samples from the previous set of samples. The training speed can be expedited by constantly training the neural network.

In a preferred embodiment, the training the deep neural network with the training data to obtain an unmanned aerial vehicle control model comprises:

training the deep neural network model with training samples obtained from the simulated environment until a condition of minimizing a difference between the state information of the unmanned aerial vehicle under action of the control information output by the deep neural network and the target state information is reached; using training samples obtained from an actual environment to train the deep neural network model which is already trained in the simulated environment; the step specifically comprises:

301: controlling the unmanned aerial vehicle to fly in the actual environment and obtaining training data in the actual environment; comprising:

in the actual environment, regarding the sensor data and continuous random target state information of the unmanned aerial vehicle as input of the deep neural network which is already trained in the simulated environment, the deep neural network outputting corresponding control information;

according to a difference between the state information of the unmanned aerial vehicle under action of the control information output by the deep neural network and the target state information, judging whether the control information complies with an expectation for reaching the target state information, and providing a positive/negative feedback;

regarding the sensor data, the target state information and the control information as a group of training samples.

Preferably, the sensor data comprises one or more kinds of data of sensors such as a three-shaft accelerator, a gyro, a magnetometer, a barometer and a GPS.

Preferably, it is feasible to control the unmanned aerial vehicle to fly in the actual environment and obtain a small amount of training data in the actual environment.

Preferably, different target signals are given to the unmanned aerial vehicle in actual environments of different scenarios, to produce a sufficient amount of data so that the neural network can learn various target signals.

Preferably, continuous random control information is provided to the unmanned aerial vehicle at a time interval. The deep neural network which is already trained in the simulated environment outputs the corresponding control information according to the sensor data and the continuous random target state information;

according to a difference between the state information of the unmanned aerial vehicle under action of the control information output by the deep neural network and the target state information, judging whether the control information complies with an expectation for reaching the target state information, and providing a positive/negative feedback;

regarding the sensor data, the target state information and the control information as a group of training samples to update the sample data.

302: training the neural network which is already trained in the simulated environment according to the training samples obtained from the actual environment, to obtain a neural network adapted for flight control of the unmanned aerial vehicle.

For ease and brevity of description, the step of training the neural network which is already trained in the simulated environment according to the training samples obtained from the actual environment, to obtain a neural network adapted for flight control of the unmanned aerial vehicle is not detailed any more here, and reference may be made to corresponding depictions in the above step 102.

Since operating the unmanned aerial vehicle in the actual environment is not completely the same as in the simulated environment, it is feasible to, through the above steps, train the neural network obtained by training in the simulated environment again, implement fine-tuning, and obtain an unmanned aerial vehicle control module adapted for flight control of the unmanned aerial vehicle.

The present disclosure further discloses a method of controlling an unmanned aerial vehicle, wherein the method comprises:

obtaining sensor data of the controlled unmanned aerial vehicle;

inputting the sensor data and the target state information into the unmanned aerial vehicle control model, to obtain control information output by the unmanned aerial vehicle control model;

outputting the control information to the controlled unmanned aerial vehicle;

wherein the unmanned aerial vehicle control model is pre-built by using the above-mentioned method of training the unmanned aerial vehicle control model based on artificial intelligence.

The embodiment of the present disclosure is adapted for the flight control system of the unmanned aerial vehicle as well as the control systems of autonomous vehicles, unmanned ships, autonomous underwater vehicle and other self-driving mobile devices.

The technical solution provided by the present embodiment can be employed to avoid problems in the prior art that the PID control algorithm is difficult in adjusting and setting the parameters, exhibits a lower precision as compared with advanced control algorithms, and shows strong inertia and undesirable object effects for some non-linear complicated environment; parameter learning is automated, and robustness is strong; the technical solution can respond to nonlinear complicated environments; the technical solution can still be used in the case of strong inertia; furthermore, the technical solution can substantially reduce the number of training samples, reduce time spent in collecting samples, and decrease costs.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
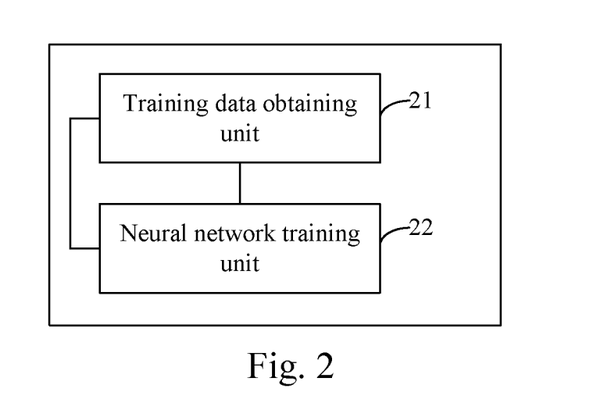
FIG. 2 is a block diagram of an unmanned aerial vehicle flight control system based on artificial intelligence according to another embodiment of the present disclosure.

FIG. 2 is a block diagram of a system for training an unmanned aerial vehicle control model based on artificial intelligence according to another embodiment of the present disclosure. As shown in FIG. 2, the system comprises a training data obtaining unit 21 and a neural network training unit 22; wherein the training data obtaining unit 21 is configured to obtain training data by using sensor data and target state information of the unmanned aerial vehicle and state information of the unmanned aerial vehicle under action of control information output by a deep neural network;

specifically, in a pre-built simulated environment, regard the sensor data and target state information of the unmanned aerial vehicle as input of the deep neural network, the deep neural network outputting corresponding control information;

according to a difference between the state information of the unmanned aerial vehicle under action of the control information output by the deep neural network and the target state information, judge whether the control information complies with an expectation for reaching target state information, and provide a positive/negative feedback;

regard the sensor data, the target state information and the control information as training samples.

Preferably, the sensor data comprises one or more kinds of data of sensors such as a three-shaft accelerator, a gyro, a magnetometer, a barometer and a GPS.

Preferably, different target state information is sent to the unmanned aerial vehicle so that the neural network can learn various target state information.

The simulated environment is specifically built by using a simulation platform such as Microsoft's Aerial Informatics and Robotics Platform (briefly called AirSim), or a Gazebo simulation platform of ROS robot operating system; an unmanned aerial vehicle simulation model is mounted in the simulated environment. The unmanned aerial vehicle simulation model may be described by using Unified Robot Description Format (URDF) language.

In essence, the simulated environment may be considered as a data generator so that massive data are generated and recorded according to sensing modes of sensors on the unmanned aerial vehicle such as a three-shaft accelerator, a gyro, a magnetometer, a barometer and a GPS, and these data are used to perform repeated test in the simulated environment. Therefore, it is feasible to increase test quantity and test speed to obtain massive data at a very small price, thereby performing training of artificial intelligence and improving the training efficiency of the artificial intelligence. In addition, the simulated test is of lower costs and can avoid impingement loss encountered upon testing in an actual environment.

The neural network training unit 22 is configured to train the deep neural network with the training data to obtain an unmanned aerial vehicle control model, the unmanned aerial vehicle control model being used to obtain the control information of the unmanned aerial vehicle according to the senor data and target state information of the unmanned aerial vehicle.

Specifically, it is feasible to train the deep neural network on the principle of minimized loss, to minimize the difference between the state information of the unmanned aerial vehicle under action of the control information output by the deep neural network and the target state information.

In a preferred embodiment, the target state information is continuous random target state information; the training data obtaining unit 21 is configured to obtain the training data by using sensor data and continuous random target state information of the unmanned aerial vehicle and state information of the unmanned aerial vehicle under action of control information output by the deep neural network;

specifically, in a pre-built simulated environment, regard the sensor data and continuous random target state information of the unmanned aerial vehicle as input of the deep neural network, the deep neural network outputting corresponding control information;

according to a difference between the state information of the unmanned aerial vehicle under action of the control information output by the deep neural network and the target state information, judge whether the control information complies with an expectation for reaching target state information, and provide a positive/negative feedback;

regard the sensor data, the target state information and the control information as a group of training samples.

The neural network is a deep reinforcement learning neural network based on DDPG (Deep Deterministic Policy Gradient), and specifically comprises a policy network and a Q value estimation network, wherein, the policy network $\mu(s|\theta^\mu)$ is responsible for outputting corresponding control information according to the sensor data and the continuous random target state information of the unmanned aerial vehicle, and its neural network parameter is $\theta^\mu$;

the Q value estimation network $Q(s, a|\theta^Q)$ is responsible for evaluating the control information according to the sensor data and continuous random target state information of the unmanned aerial vehicle and the control information output by the policy network, and estimating whether the control information can gain a long-term profit, and its neural network parameter is $\theta^Q$;

the policy network and the Q value estimation network are updated according to output of the Q value estimation network.

Preferably, it is feasible to create and use a target network including duplicates of the policy network and the Q value estimation network to calculate a target value.

Preferably, the policy network comprises: an input layer; a fully-connected layer cyclically repeating at least once, a non-linear activation layer; and an output layer. According to an embodiment, it is possible to select: input layer→fully-connected layer→nonlinear activation layer→fully-connected layer→nonlinear activation layer→output layer. Certainly, other network structures can also be designed. The present disclosure does not limit this.

Preferably, the Q value estimation network comprises: an input layer; a fully-connected layer cyclically repeating at least twice, a nonlinear activation layer; a joining layer; and an output layer. According to an embodiment, it is possible to select: input layer→fully-connected layer→nonlinear activation layer→joining layer→fully-connected layer→nonlinear activation layer→fully-connected layer→output layer. Certainly, other network structures can also be designed. The present disclosure does not limit this. The control information and the target state information are not used unless they are input to the second full-connected layer of the network; the sensor signals undergo the processing of the fully-connected layer and the nonlinear activation layer, and then are, together with the control information and the target state information, input into the joining layer for subsequent processing.

Preferably, the neural network training unit 22 comprises:
a training sample input sub-unit 201 configured to select and input training samples into the neural network;

Specifically, it is feasible to select, from a set of samples, a group of training samples formed by the sensor data, the target state information and the control information whose correspondence relationship has already been built, and input the group of training samples into the neural network, namely, one end of the input is the sensor data and the target state information, and the other end of the input is the control information;

a Q value estimation network updating sub-unit 202 configured to use a minimum loss function to update the Q value estimation network.

It is feasible to calculate a set of the sensor data and the target state information and the control information before a time t, $$s_t = (x_1, a_1, \ldots, a_{t-1}, x_t) = x_t \quad (1)$$

In equation (1), $x_t$ is the sensor data and the target state information at the time t; $a_t$ is the control information at the time t;

use a Q value function to describe a long-term profit $$\text{long-term profit is } Q^\pi(s_t, a_t) = E[R_t|S_t, a_t] \quad (2)$$

where $R_t = \sum_{i=t}^{T} \gamma^{i-t} r_i, a_i)$ is a long-term profit sum gained at the time t and resulting from discount, $\gamma \in [0,1]$ is a discount coefficient, $r(s_t, a_t)$ is a profit function at the time t, T is the time when the act ends, and $\pi$ is a policy probability;

since the policy probability $\pi$ is predetermined, it is recorded as a target policy $\mu: S \leftarrow A$, where S is a state space, and A is an act space, and meanwhile Bellman Equation (2) is used to obtain:

$$\theta^\mu(s_t, a_t) = E_{s_{t+1} \sim E}[r(s_t, a_t) + \gamma Q^\mu(S_{t+1}, \mu(S_{t+1}))] \quad (3)$$

In equation (3), $s_{t+1} \sim E$ represents that the sensor data and target state information at time t+1 are obtained from an environment E, and $\mu(S_{t+1})$ represents the act to which the sensor data and target state information at time t+1 are mapped through the target policy $\mu$;

Use the principle of maximum likelihood estimation to update the Q value estimation network $Q(s, a|\theta^Q)$ whose network weight parameter is $\theta^Q$ through the minimum loss function, the used loss function being:

$$L(\theta^Q) = E_{\mu'}[(Q(S_t, a_t|\theta^Q) - y_t)^2] \quad (4)$$

In equation (4), $y_t = r(s_t, a_t) + \gamma Q(S_{t+1}, \mu(S_{t+1}))|\theta^Q$;

In this way, $Q(s, a|\theta^Q)$ gets increasingly closer to an actual value, namely, the modeling for scenarios gets increasingly precise.

A policy network updating sub-unit 203 is configured to use a policy gradient to update the policy network.

As for the policy network whose actual parameter is $\theta^\mu$, a chain rule is employed to obtain the policy gradient $$\nabla_{\theta^\mu}\mu = E_{\mu'}[\nabla_a Q(S, a|\theta^Q)|_{s=s_t, a=\mu(s_t)} \nabla_{\theta^\mu}\mu(s|\theta^\mu)|_{s=s_t}] \quad (5),$$

and then the policy gradient is used to update the policy function $\mu(s|\theta^\mu)$ of the policy network.

A target network updating sub-unit 204 is configured to use a slow update policy to update the target network.

Under many environments (including TORCS), it proves unstable that the neural network is directly used to implement the Q value function. Hence, in the present embodiment, the duplicates of the policy network and the Q value estimation network are used to calculate the target value.

The weights of the target network use the slow update policy, i.e., let themselves slowly track the learnt network for updating. The used slow update policy is:

$$\theta^{Q'} \leftarrow \tau\theta^{Q} + (1-\tau)\theta^{Q'} \quad (6)$$

$$\theta^{\mu'} \leftarrow \tau\theta^{\mu} + (1-\tau)\theta^{\mu'} \quad (7)$$

In formula (6) and (7), $\tau$ is an update rate, and $\tau \ll 1$. This means that the target value is limited as slowing changing, which substantially improves stability of learning.

Through the above steps, a DDPG-based deep reinforcement learning network is obtained by training, and is a converging neural network.

One or more groups of training samples are randomly selected from the set of samples to train the neural network. The samples may be made relatively stable by randomly selecting the training samples from the previous set of samples. The training speed can be expedited by constantly training the neural network.

In a preferred embodiment, the training the deep neural network with the training data to obtain an unmanned aerial vehicle control model comprises:

training the deep neural network model with training samples obtained from the simulated environment until a condition of minimizing a difference between the state information of the unmanned aerial vehicle under action of the control information output by the deep neural network and the target state information is reached; using training samples obtained from an actual environment to train the deep neural network model which is already trained in the simulated environment; the step specifically comprises:

the training data obtaining unit 21 configured to control the unmanned aerial vehicle to fly in the actual environment and obtain training data in the actual environment; comprising:

in the actual environment, regarding the sensor data and continuous random target state information of the unmanned aerial vehicle as input of the deep neural network which is already trained in the simulated environment, the deep neural network outputting corresponding control information;

according to a difference between the state information of the unmanned aerial vehicle under action of the control information output by the deep neural network and the target state information, judging whether the control information complies with an expectation for reaching the target state information, and providing a positive/negative feedback;

regarding the sensor data, the target state information and the control information as a group of training samples.

Preferably, the sensor data comprises one or more kinds of data of sensors such as a three-shaft accelerator, a gyro, a magnetometer, a barometer and a GPS.

Preferably, it is feasible to control the unmanned aerial vehicle to fly in the actual environment and obtain a small amount of training data in the actual environment.

Preferably, different target signals are given to the unmanned aerial vehicle in actual environments of different scenarios, to produce a sufficient amount of data so that the neural network can learn various target signals.

Preferably, continuous random control information is provided to the unmanned aerial vehicle at a time interval. The deep neural network which is already trained in the simulated environment outputs the corresponding control information according to the sensor data and the continuous random target state information;

according to a difference between the state information of the unmanned aerial vehicle under action of the control information output by the deep neural network and the target state information, judging whether the control information complies with an expectation for reaching the target state information, and providing a positive/negative feedback;

regarding the sensor data, the target state information and the control information as a group of training samples to update the sample data.

The neural network training unit 22 is configured to train the neural network which is already trained in the simulated environment according to the training samples obtained from the actual environment, to obtain a neural network adapted for flight control of the unmanned aerial vehicle.

Since operating the unmanned aerial vehicle in the actual environment is not completely the same as in the simulated environment, it is feasible to, through the above steps, train the neural network obtained by training in the simulated environment again, implement fine-tuning, and obtain a neural network adapted for flight control system of the unmanned aerial vehicle.

The embodiment of the present disclosure is adapted for the flight control system of the unmanned aerial vehicle as well as the control systems of autonomous vehicles, unmanned ships, autonomous underwater vehicle and other self-driving mobile devices.

The present disclosure further discloses a system of controlling an unmanned aerial vehicle, wherein the system comprises:

a navigation/inertia measurement unit configured to obtain sensor data of the controlled unmanned aerial vehicle;

a control information obtaining unit configured to input the sensor data and the target state information into the unmanned aerial vehicle control model, to obtain control information output by the unmanned aerial vehicle control model;

a control information output unit configured to output the control information to the controlled unmanned aerial vehicle;

wherein the unmanned aerial vehicle control model is pre-built by using the above-mentioned system of training the unmanned aerial vehicle control model based on artificial intelligence.

The technical solution provided by the present embodiment can be employed to avoid problems in the prior art that the PID control algorithm is difficult in adjusting and setting the parameters, exhibits a lower precision as compared with advanced control algorithms, and shows strong inertia and undesirable object effects for some non-linear complicated environment; parameter learning is automated, and robustness is strong; the technical solution can response to non-linear complicated environments; the technical solution can still be used in the case of strong inertia; furthermore, the technical solution can substantially reduce the number of training samples, reduce time spent in collecting samples, and decrease costs.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communication connection as displayed or discussed may be performed via some interfaces, and indirect coupling or communication connection of means or units may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 3:
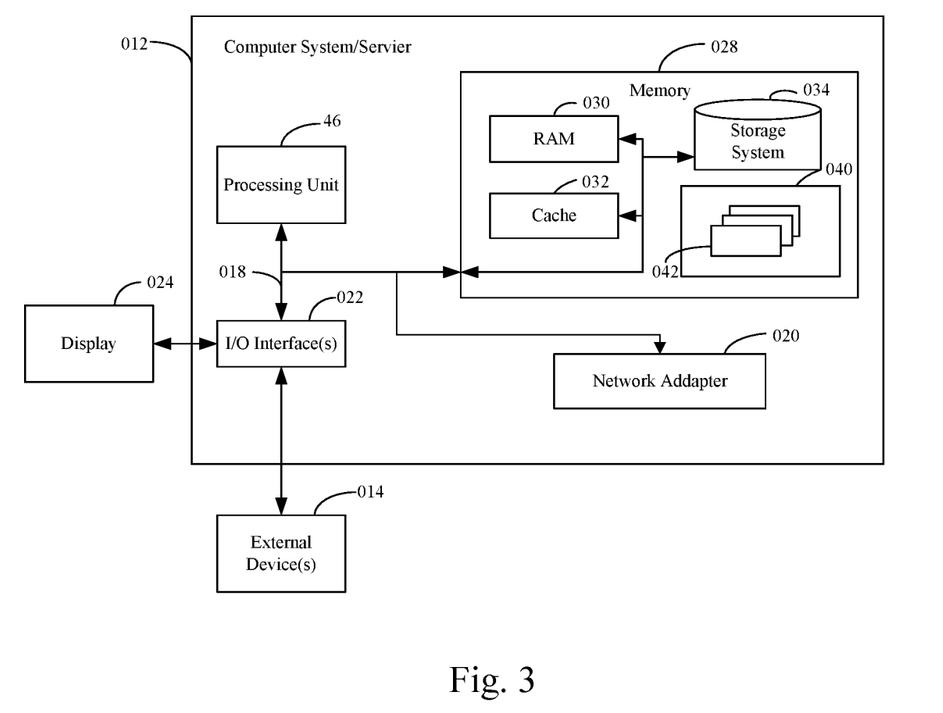
FIG. 3 is a block diagram of an example computer system/server adapted to implement an embodiment of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 3, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes functions and/or methods in embodiments described in the present disclosure by running programs stored in the system memory 028.

The aforesaid computer program may be arranged in a computer storage medium, namely, the computer storage medium is encoded with the computer program. The computer program, when executed by one or more computers, enables one or more computers to execute the flow of the method and/or operations of the apparatus as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not cause essence of corresponding technical solutions to depart from the spirit and scope of technical solutions of embodiments of the present disclosure.

What is claimed is:

1. A computer-implemented method for training a control model of an unmanned aerial vehicle based on artificial intelligence, wherein the method comprises:
   in a pre-built simulated environment, regarding sensor data and target state information of the unmanned aerial vehicle as inputs of a deep neural network, the deep neural network outputting corresponding control information;
   according to a difference between the state information of the unmanned aerial vehicle which is under the control of the control information output by the deep neural network and the target state information, judging whether the control information complies with an expectation of achieving target state information, and giving positive/negative feedback;
   regarding the sensor data, the target state information, and the control information as training data; and
   training the deep neural network with the training data on a principle of minimized loss to minimize the difference between the state information of the unmanned aerial vehicle under the control of the control information output by the deep neural network and the target state information, to obtain the control model of the unmanned aerial vehicle, the control model being used to obtain control information of the unmanned aerial vehicle according to senor data and target state information of the unmanned aerial vehicle,
   wherein the method further comprises:
   obtaining sensor data of the unmanned aerial vehicle;
   inputting, the sensor data and target state information into the control model of the unmanned aerial vehicle to obtain control information output by the control model; and
   outputting the control information to the unmanned aerial vehicle,
   wherein the training the deep neural network with the training data to obtain the control model of the unmanned aerial vehicle comprises:
   training the deep neural network with training data obtained from the simulated environment until a condition of minimizing a difference between the state information of the unmanned aerial vehicle under the control of the control information output by the deep neural network and the target state information i reached: controlling the unmanned aerial vehicle to fly in the actual environment and obtaining training data in the actual environment; and training the neural network which is already trained in the simulated environment according to the training samples obtained from the actual environment, to obtain a neural network adapted for flight control of the unmanned aerial vehicle.

2. The computer-implemented method according to claim 1, wherein the target state information is continuous random information.

3. The computer-implemented method according to claim 1, wherein the deep neural network comprises a deep reinforcement learning neural network based on a Deep Deterministic Policy Gradient.

4. The computer-implemented method according to claim 1, wherein the control model comprises a policy network and a Q value estimation network;
   the policy network is responsible for outputting corresponding control information according to the sensor data and the target state information; and
   the Q value estimation network is responsible for evaluating the control information according to the sensor data, the target state information and the control information output by the policy network.

5. A device, wherein the device comprises:
   one or more processors;
   a memory for storing one or more programs, the one or more programs, when executed by said one or more processors, enabling said one or more processors to implement the following operation:
   in a pre-built simulated environment, regarding sensor data and target state information of an unmanned aerial vehicle as inputs of a deep neural network, the deep neural network outputting corresponding control information;
   according to a difference between the state information of the unmanned aerial vehicle which is under the control of the control information output by the deep neural network and the target state information, judging whether the control information complies with an expectation of achieving target state information, and giving positive/negative feedback;
   regarding the sensor data, the target state information, and the control information as training data; and training the deep neural network with the training data on a principle of minimized loss to minimize the difference between the state information of the unmanned aerial vehicle under the control of the control information output by the deep neural network and the target state information, to obtain a control model of the unmanned aerial vehicle, the control model being used to obtain control information of the unmanned aerial vehicle according to senor data and target state information of the unmanned aerial vehicle, wherein the operation further comprises:

obtaining sensor data of the unmanned aerial vehicle:

inputting the sensor data and target state information into the control model of the unmanned aerial vehicle, to obtain control information output by the control model; and outputting the control information to the unmanned aerial vehicle, wherein the training the deep neural network with the training data to obtain the control model of the unmanned aerial vehicle comprises:

training the deep neural network with training data obtained from the simulated environment until a condition of minimizing a difference between the state information of the unmanned aerial vehicle under the control of the control information output by the deep neural network and the target state information is reached: controlling the unmanned aerial vehicle to fly in the actual environment and obtaining training data in the actual environment; and training the neural network which is already trained in the simulated environment according to the training samples obtained from the actual environment, to obtain a neural network adapted for flight control of the unmanned aerial vehicle.

6. The device according to claim 5, wherein the target state information is continuous random information.

7. The device according to claim 5, wherein the deep neural network comprises a deep reinforcement learning neural network based on a Deep Deterministic Policy Gradient.

8. The device according to claim 5, wherein the control model of the unmanned aerial vehicle comprises a policy network and a Q value estimation network;

the policy network is responsible for outputting corresponding control information according to the sensor data and the target state information; and the Q value estimation network is responsible for evaluating the control information according to the sensor data, the target state information and the control information output by the policy network.

9. A non-transitory computer readable medium on which a computer program is stored, wherein the program, when executed by a processor, implements the following operation:

in a pre-built simulated environment, regarding sensor data and target state information of an unmanned aerial vehicle as inputs of a deep neural network, the deep neural network outputting corresponding control information;

according to a difference between the state information of the unmanned aerial vehicle which is under the control of the control information output by the deep neural network and the target state information, judging whether the control information complies with an expectation of achieving target state information, and giving positive/negative feedback;

regarding the sensor data, the target state information, and the control information as training data; and training the deep neural network with the training data on a principle of minimized loss to minimize the difference between the state information of the unmanned aerial vehicle under the control of the control information output by the deep neural network and the target state information, to obtain a control model of the unmanned aerial vehicle, the control model being used to obtain control information of the unmanned aerial vehicle according to senor data and target state information of the unmanned aerial vehicle, wherein the operation further comprises:

obtaining sensor data of the unmanned aerial vehicle:

inputting the sensor data and target state information into the control model of the unmanned aerial vehicle, to obtain control information output by the control model; and outputting the control information to the unmanned aerial vehicle, wherein the training the deep neural network with the training data to obtain the control model of the unmanned aerial vehicle comprises:

training the deep neural network with training data obtained from the simulated environment until a condition of minimizing a difference between the state information of the unmanned aerial vehicle under the control of the control information output by the deep neural network and the target state information is reached: controlling the unmanned aerial vehicle to fly in the actual environment and obtaining training data in the actual environment; and training the neural network which is already trained in the simulated environment according to the training samples obtained from the actual environment, to obtain a neural network adapted for flight control of the unmanned aerial vehicle.

10. The non-transitory computer readable medium according to claim 9, wherein the target state information is continuous random information.

11. The non-transitory computer readable medium according to claim 9, wherein the deep neural network comprises a deep reinforcement learning neural network based on a Deep Deterministic Policy Gradient.

12. The non-transitory computer readable medium according to claim 9, wherein the control model of the unmanned aerial vehicle comprises a policy network and a Q value estimation network;

the policy network is responsible for outputting corresponding control information according to the sensor data and the target state information; and the Q value estimation network is responsible for evaluating the control information according to the sensor data, the target state information and the control information output by the policy network.

* * * * *

UNITED STATES PATENT AND TRADEMARK OFFICE
CERTIFICATE OF CORRECTION

PATENT NO. : 11,150,655 B2
APPLICATION NO. : 16/020340
DATED : October 19, 2021
INVENTOR(S) : Bo Zhou et al.

It is certified that error appears in the above-identified patent and that said Letters Patent is hereby corrected as shown below:

In the Claims

Column 20, Line 4-5, Claim 1:
After "aerial vehicle according to"
Delete "senor"
Insert -- sensor --.

Column 20, Lines 8-9, Claim 1:
After "data of the unmanned aerial vehicle; inputting"
Delete ",".

Column 20, Line 23, Claim 1:
After "and the target state information"
Delete "i"
Insert -- is --.

Column 20, Lines 23-24, Claim 1:
After "state information is"
Delete "reached:"
Insert -- reached; --.

Column 20, Line 50, Claim 5:
After "a memory for storing one or more"
Delete "programs, the one"
Insert -- programs,
           the one --.

Column 21, Lines 8-9, Claim 5:
After "unmanned aerial vehicle according to"

Signed and Sealed this
Seventh Day of February, 2023

Katherine Kelly Vidal
*Director of the United States Patent and Trademark Office*

CERTIFICATE OF CORRECTION (continued)
U.S. Pat. No. 11,150,655 B2

Delete "senor"
Insert -- sensor --.

Column 21, Lines 27-28, Claim 5:
After "the target state information is"
Delete "reached:"
Insert -- reached; --.

Column 22, Lines 14-15, Claim 9:
After "unmanned aerial vehicle according to"
Delete "senor"
Insert -- sensor --.

Column 22, Lines 33-34, Claim 9:
After "target state information is"
Delete "reached:"
Insert -- reached; --.